Patented Jan. 16, 1923.

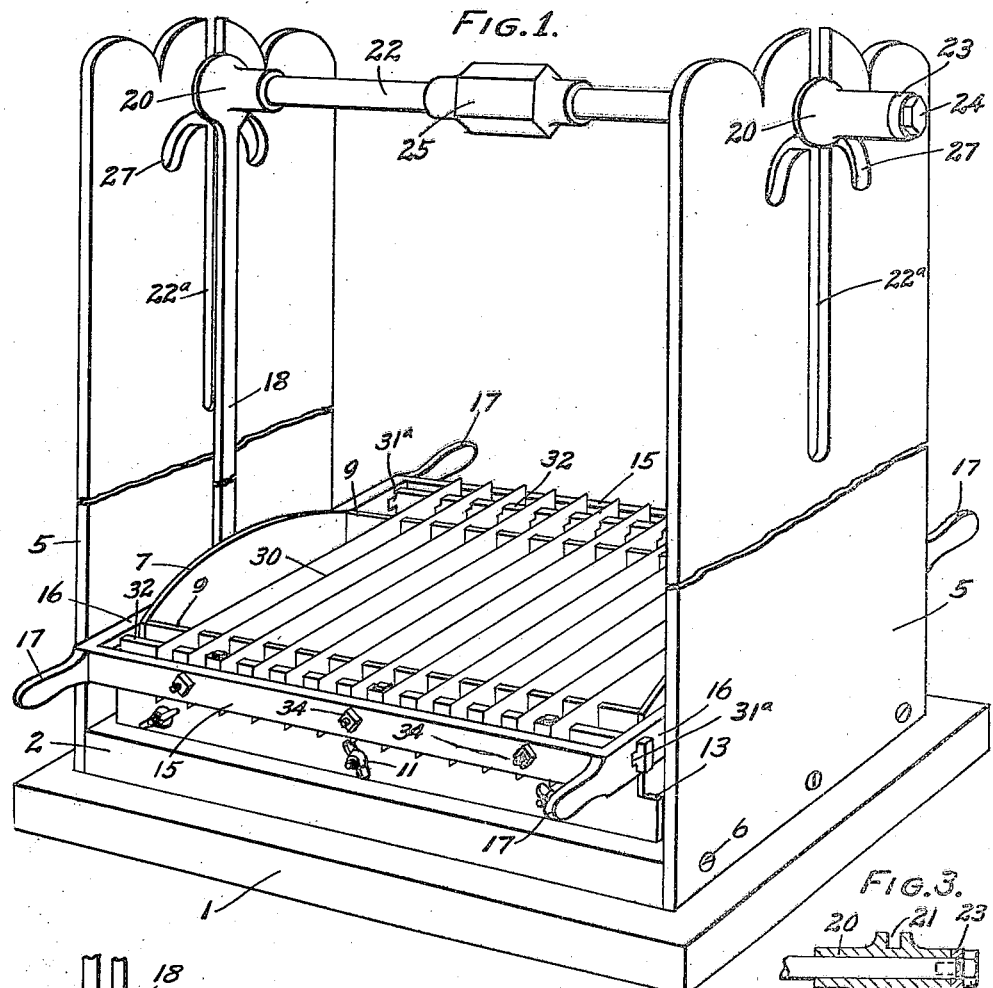

1,442,762

UNITED STATES PATENT OFFICE.

GEORGE F. DU BUQUE, OF LOS ANGELES, CALIFORNIA.

BREAD SLICER.

Application filed January 18, 1921. Serial No. 438,186.

*To all whom it may concern:*

Be it known that I, GEORGE F. DU BUQUE, a citizen of the United States, residing at Los Angeles, in the county of Los Angeles and State of California, have invented new and useful Improvements in Bread Slicers, of which the following is a specification.

It is the object of this invention to provide a slicing mechanism particularly adapted for slicing bread, and so arranged that an entire loaf of bread may be sliced at one operation.

The device consists essentially of a supporting tray for a loaf of bread and a vertically movable and swingable frame carrying a plurality of blades for performing the slicing operation.

The invention will be readily understood from the following description of the accompanying drawings, in which:

Figure 1 is a perspective view of a device constructed in accordance with the invention.

Fig. 2 is a fragmentary front elevation of the device partly broken away.

Fig. 3 is a longitudinal section through one of the bearings for the slicing frame.

Fig. 4 is a detail section through the front of the slicing frame, showing one of the attaching bolts for the slicing blades in front of one of the blades.

Fig. 5 is a similar view taken through the rear of the slicing frame, and showing one of the slicing blades in front of one of the attaching bolts.

The mechanism may comprise a suitable base 1, preferably, carrying a superimposed base 2 of reduced area, and which forms the base of the bread carrying tray. As an instance of this arrangement, ribs 3 project upwardly from base 2, and extend across the base in transversely spaced relation, the spaces between the ribs being indicated at 4.

Bearing uprights 5 extend upwardly from the ends of base 2, and may be suitably connected thereto as by screws 6. Side and end walls for the bread carrying tray extend above ribs 3 with the end walls 7 connected as by screws 8 to the end ribs, and side walls 9 received against the ends of the ribs. For this purpose, bolts 10 may extend through suitable ones of the spaces 4 with the heads of said bolts engaging one side wall, and wing nuts 11 threaded upon the ends of the bolts beyond the other side wall, so as to separably retain the side walls in position. The side walls are provided with vertical slots 12 in alinement with spaces 4, and the ends of said side walls, preferably, project beyond the end ribs and end walls 7, so as to form shoulders 13.

In practice side walls 9 are, preferably, flat, so as to form a bread tray of a width equal to the length of ribs 3, but when a loaf of bread of less width is placed in the bread tray, the side walls may be readily removed by moving wing nuts 11 and other side walls placed in position, which have their upper slotted portions inwardly offset from the base portions of the same received against the ends of the ribs, so as to provide a narrower bread tray.

The loaf of bread placed in the bread tray as thus constructed, will extend upwardly between side uprights 5, which are spaced somewhat beyond the end walls of the bread tray, and a slicing frame carrying slicing blades is supported by side uprights 5 above the loaf of bread, so as to be readily swung back and forth across the loaf of bread, and at the same time moved downwardly as the slicing blades cut through the loaf.

As an instance of this arrangement, a rectangular frame is provided of suitable size as to be received over the bread tray and between side uprights 5. This frame consists of side bars 15 and end bars 16 terminating in handles 17. The downward movement of this frame is limited by the abutment of end bar 16 upon shoulders 13 of the bread tray. The slicing frame is supported by uprights 18 journaled to end bars 16 mid-way of their length, as by the pivot bolts 19. The upper ends of these uprights form bearings 20 in which are provided annular grooves 21 adapted to be received in vertical slots 22$^a$, extending downwardly from the upper ends of side uprights 5. Shafts 22 are received through the respective bearings 20, and are fixed with relation to said bearings by means of end washers 23, and end bolts 24. The inner ends of shafts 22 are adjacent one another, and may be connected by a suitable threaded sleeve 25. The construction as thus described, provides for the ready swinging of the slicing frame back and forth above the bread tray, and also provides for vertical movement of said frame with relation to side uprights 5 through the movement of bearings 20 up and down in slot 22$^a$.

In order that the slicing frame may be held in inoperative position at the upper end of slots 22ª, and above a loaf of bread in the bread tray, downwardly curved transverse slots 27, preferably, extend from opposite sides of slots 22ª adjacent the upper ends of uprights 5, so that bearings 20 may be moved into said transverse slots for retaining the slicing frame in its elevated position.

A plurality of blades 30 are mounted in the slicing frame suitably transversely spaced to provide slices of the desired width, and also be received in the slots 12 of side walls 9, and within the spaces 4 provided between ribs 3. The blades are so positioned that their cutting edges will be held out of contact with bases of the slots 12 by abutment of the slicing frame against shoulders 13. The slicing blades are preferably double-edged, and extend above and below the slicing frame, so that the slicing frame may be mounted between the side uprights with either surface thereof turned downwardly to perform the slicing operation.

The blades are preferably removably held in position, so as to be readily replaceable, and for this purpose are provided with elongated end slots 31 adapted to receive cross bars 32. These cross bars are elongated in cross section, so that when turned in one position, they may be readily moved through the elongated slots 31 provided in the slicing blades and through similar elongated slots 31ª, provided in end bars 16, but when turned at right angles, will be positively held against longitudinal displacement. The bars 32 are adjusted along the lengths of slots 31 and 31ª, so as to tension blades 30, as by means of hook bolts 33 having their hook ends received over the bars 32 with the threaded ends of said bolts received through side bars 15, and provided with suitable nuts 34 for adjusting the said bolts.

It will thus be seen that I have provided an extremely simplified device adapted to support a loaf of bread or the like, so that a vertically movable and swingable slicing frame carrying a plurality of blades may be moved with relation to a loaf of bread or the like supported in the tray, so as to cut the entire loaf into slices at one operation.

Various changes may be made without departing from the spirit of the invention as claimed.

What is claimed is:

1. A slicing mechanism comprising a support, vertically slotted bearing uprights, and a slicing member including suspending arms and a cross shaft journaled in said slots for swinging and vertical movement of said slicing member, said slots having cross slots.

2. A slicing mechanism comprising a supporting tray, a slicing member pivoted for vertical swinging movement, and means supporting said member to allow of the vertical movement of the pivot of said member and the sustaining of said pivot in a definite position.

3. A slicing mechanism comprising a tray, spaced uprights, a slicing member comprising spaced uprights, a blade carrying frame, pivoted to the lower ends of the second uprights, and a shaft journaled in the upper ends of the second uprights, the first uprights being formed with vertical slots adapted to receive said shaft for allowing of a vertical adjustment of the slicing member, and cross slots in communication with the vertical slots for sustaining the shaft and, consequently, the slicing member, in a definite vertical position.

In testimony whereof I have signed my name to this specification.

GEORGE F. DU BUQUE.